(12) United States Patent
Mater, Jr. et al.

(10) Patent No.: US 11,364,760 B2
(45) Date of Patent: Jun. 21, 2022

(54) TANDEM AXLE SUSPENSION SYSTEM WITH FIXED KEEPER AND SLIPPER SPRINGS

(71) Applicant: Stalwart Design & Development LLC, Elkhart, IN (US)

(72) Inventors: Robert F. Mater, Jr., Elkhart, IN (US); Auldreg R. Dismuke, Elkhart, IN (US)

(73) Assignee: RV Ride Control, LLC, Elkhart, IN (US)

( * ) Notice: Subject to any disclaimer, the term of this patent is extended or adjusted under 35 U.S.C. 154(b) by 575 days.

(21) Appl. No.: 16/477,014

(22) PCT Filed: Jul. 12, 2017

(86) PCT No.: PCT/US2017/041673
§ 371 (c)(1),
(2) Date: Jul. 10, 2019

(87) PCT Pub. No.: WO2018/013659
PCT Pub. Date: Jan. 18, 2018

(65) Prior Publication Data
US 2021/0213796 A1    Jul. 15, 2021

Related U.S. Application Data

(60) Provisional application No. 62/362,851, filed on Jul. 15, 2016.

(51) Int. Cl.
*B60G 11/04* (2006.01)
*B60G 9/00* (2006.01)

(52) U.S. Cl.
CPC .............. *B60G 9/003* (2013.01); *B60G 11/04* (2013.01); *B60G 2200/31* (2013.01);
(Continued)

(58) Field of Classification Search
CPC .... B60G 9/003; B60G 11/04; B60G 2200/31; B60G 2202/112; B60G 2204/121; B60G 2206/601
(Continued)

(56) References Cited

U.S. PATENT DOCUMENTS 3,195,917 A     7/1965  Baldock
3,586,308 A *   6/1971  King ................ B60G 5/047
                                                267/52

(Continued)

FOREIGN PATENT DOCUMENTS

GB     1110602 A     4/1968
GB     1532316 A     11/1978

OTHER PUBLICATIONS

Preliminary Report on Patentability, for PCT/US17/41673 dated Jan. 14, 2019.
(Continued)

*Primary Examiner* — Toan C To
(74) *Attorney, Agent, or Firm* — Warren D. Schickli; Stites & Harbison, PLLC

(57) ABSTRACT

A tandem axle assembly includes a first slipper spring and a second slipper spring. The two slipper springs are configured or oriented in series with the slipper ends of the two slipper springs oriented toward each other. A keeper for a tandem axle suspension assembly is also disclosed.

16 Claims, 5 Drawing Sheets

(52) U.S. Cl.
CPC .. *B60G 2202/112* (2013.01); *B60G 2204/121* (2013.01); *B60G 2206/601* (2013.01)

(58) Field of Classification Search
USPC ............... 280/124.163, 124.17, 124.174
See application file for complete search history.

(56) References Cited

U.S. PATENT DOCUMENTS

| | | | | |
|---|---|---|---|---|
| 3,591,197 A * | 7/1971 | Haley | ............... | B60G 5/047 280/682 |
| 3,738,631 A * | 6/1973 | Haley | ............... | B60G 5/047 267/52 |
| 3,799,562 A * | 3/1974 | Hinchliff | ............ | B60G 5/047 280/682 |
| 3,841,652 A * | 10/1974 | Higginson | ......... | B60G 5/047 280/682 |
| 4,033,606 A * | 7/1977 | Ward | ................ | B60G 5/047 280/682 |
| 4,383,703 A * | 5/1983 | Honda | .............. | B60G 5/047 280/682 |
| 4,412,690 A * | 11/1983 | Prokop | ............. | B60G 5/047 267/262 |
| 4,502,707 A | 3/1985 | Jable et al. | | |
| 5,209,518 A * | 5/1993 | Heckenliable | ....... | B60G 11/04 280/680 |
| 5,662,314 A * | 9/1997 | Stoltzfus | ............ | B60G 5/00 267/271 |
| 6,478,321 B1 * | 11/2002 | Heitzmann | .......... | B60G 5/047 267/219 |
| 7,850,195 B2 * | 12/2010 | Simard | ............. | B60G 11/465 280/678 |
| 7,950,678 B1 * | 5/2011 | Bauder | ............. | B60G 11/02 280/43.18 |
| 9,333,827 B2 | 5/2016 | Mater, Jr. et al. | | |
| 2007/0145656 A1 * | 6/2007 | Svendsen | ........... | F16F 1/26 267/260 |
| 2014/0117639 A1 * | 5/2014 | Ramsey | ............. | B60G 9/04 280/124.11 |

OTHER PUBLICATIONS

Written Opinion and International Search Report for PCT/US17/41673 dated Oct. 31, 2017.

* cited by examiner

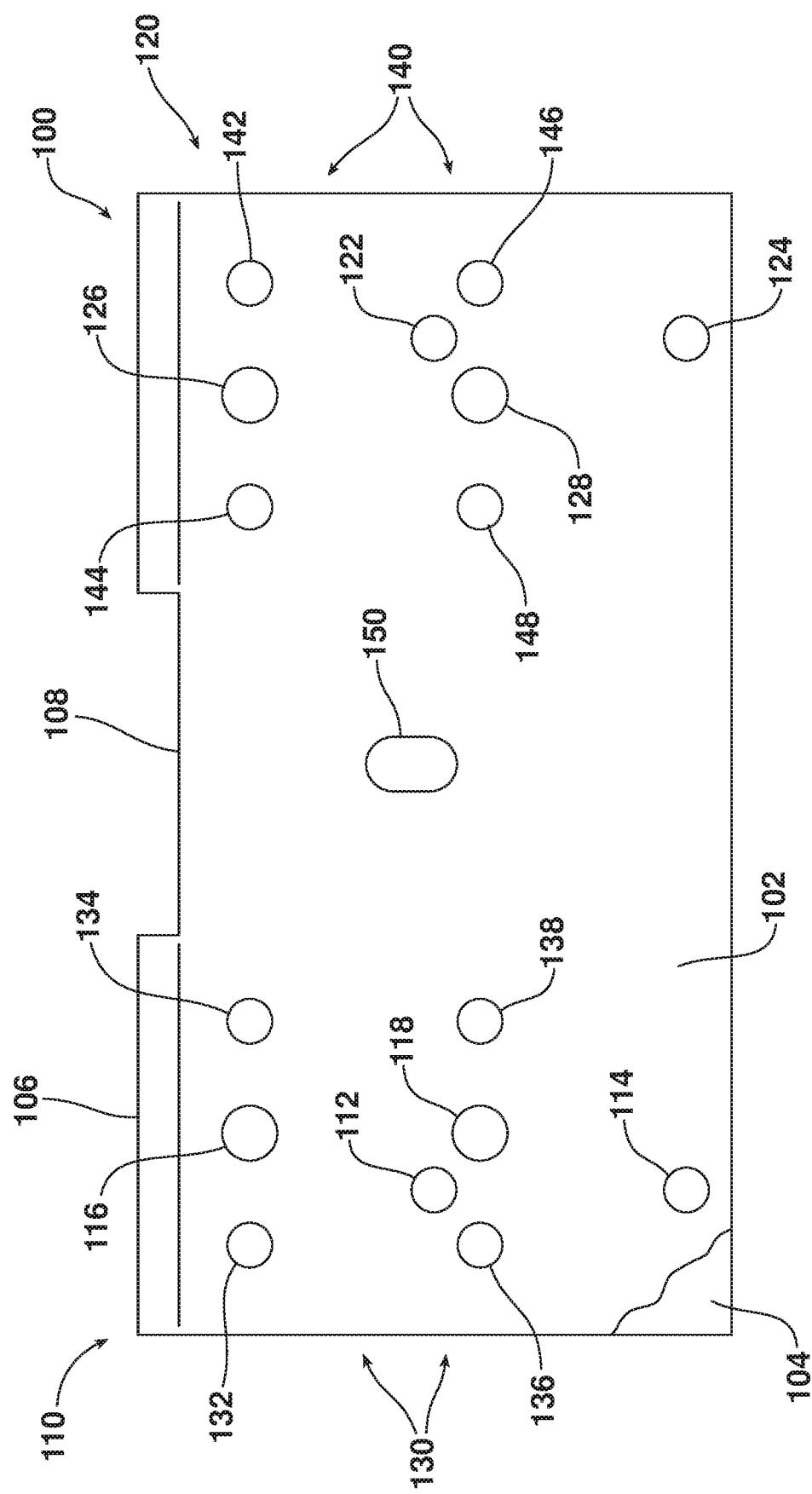

ns in US 11,364,760 B2

TANDEM AXLE SUSPENSION SYSTEM WITH FIXED KEEPER AND SLIPPER SPRINGS

This application is the national stage of international patent application no. PCT/US2017/041673 filed on Jul. 12, 2017, which in turn claims priority from U.S. Provisional Patent Application No. 62/362,851 filed on Jul. 15, 2016, the disclosures of which are incorporated herein by reference in their entirety.

TECHNICAL FIELD

This document relates generally to the trailer equipment field and, more particularly, to a new and improved tandem axle suspension system. That tandem axle suspension system includes a fixed center keeper that holds the slipper ends of two slipper springs.

BACKGROUND

FIG. 1 illustrates a prior art suspension system SS which includes an equalizer A that is pivotally mounted to the center hanger B of the trailer frame C and connected to the first spring D and second spring E by means of two shackles F, G. The same structure is also provided on the opposite side of the trailer.

This construction includes a total of ten moving parts and ten bolts that connect those parts. The ten moving parts and the ten bolts that connect them are lubricated by soft plastic bushings with a useful life of as little as 1,000 miles. When these bushings fail, the entire suspension begins to self-destruct with steel on steel friction grinding the components into failure.

In addition to the poor durability noted above which requires frequent and expensive maintenance, prior art suspensions of the type illustrated in FIG. 1 suffers from a number of additional drawbacks. Most lack suspension alignment capability. They fail to provide for control of spring rebound and compression energy. Further, they suffer from diminished tire traction during hard or panic braking due to a condition referred to as "axle roll up." More specifically, panic braking causes a sudden rearward rotation of the forward axle H. This rotation forces the equalizer A to severely rotate rearward and partially lift the rear tires I from the pavement J thereby reducing braking traction with the road surface.

The new and improved suspension system described in this document addresses and solves all of these shortcomings of the prior art suspension system SS noted above.

SUMMARY

In accordance with the purposes and benefits described herein, a new and improved tandem axle suspension assembly is provided. That tandem axle suspension assembly comprises a first slipper spring, having a first eye and a first slipper end, and a second slipper spring having a second eye and a second slipper end. The first slipper spring and the second slipper spring are provided in series with the first slipper end and the second slipper end oriented toward each other.

The tandem axle suspension assembly may further include a keeper receiving the first slipper end and the second slipper end. The keeper may include a first frame support that rides on the first slipper end and a second frame support that rides on the second slipper end. That first frame support may include a first roller bearing. That second frame support may include a second roller bearing.

The first frame support of the tandem axle suspension assembly may include a first roller bearing bolt. The first roller bearing may be received around that first roller bearing bolt. Similarly, the second frame support of the tandem axle suspension assembly may include a second bearing bolt. The second roller bearing may be received around that second roller bearing bolt.

The keeper of the tandem axle suspension assembly may include a housing. That housing may have a u-shaped cross-section. Further, the housing may include a receiver that receives a center hanger on a frame of a trailer to which the tandem axle suspension assembly is attached.

Still further, the housing may be described as including a center section, a first end section and a second end section. The first end section and the second end section both depend from the center section. The receiver may be provided in the center section between the first end section and the second end section.

The tandem axle suspension assembly may further include a mounting bolt extending through a first mounting receiver in the first end section, a second mounting receiver in the second end section and a third mounting receiver in the center hanger.

The keeper of the tandem axle suspension system may include a first spring retainer bolt. The first slipper end may be captured between the first spring retainer bolt and the first roller bearing. The keeper may also include a second spring retainer bolt. The second slipper end may be captured between the second spring retainer bolt and the second roller bearing.

In accordance with an additional aspect, a new and improved keeper is provided for a tandem axle suspension assembly. That keeper comprises a housing including: (a) a first set of receivers including a first spring retainer receiver, a second spring retainer receiver, a first roller bearing mounting receiver, a second roller bearing mounting receiver and (b) a second set of receivers including a third spring retainer receiver, a fourth spring retainer receiver, a third roller bearing mounting receiver and a fourth roller bearing mounting receiver.

The keeper may further include a third set of receivers for mounting a first shock. That third set of mounting receivers may include a first shock mounting receiver, a second shock mounting receiver, a third shock mounting receiver and a fourth shock mounting receiver. Still further, the keeper may also include a fourth set of receivers for mounting a second shock. The fourth set of mounting receivers may include a fifth shock mounting receiver, a sixth shock mounting receiver, a seventh shock mounting receiver and an eighth shock mounting receiver.

The first roller bearing mounting receiver may be provided between the first shock mounting receiver and the second shock mounting receiver. The second roller bearing mounting receiver may be provided between the third shock mounting receiver and the fourth shock mounting receiver. The third roller bearing receiver may be provided between the fifth shock mounting receiver and the sixth shock mounting receiver. The fourth roller bearing mounting receiver may be provided between the seventh shock mounting receiver and the eighth shock mounting receiver.

In the following description, there are shown and described several preferred embodiments of the new and improved tandem axle suspension system. As it should be realized, the system is capable of other, different embodiments and its several details are capable of modification in various, obvious aspects all without departing from the system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification illustrate several aspects of the tandem axle suspension system and together with the description serve to explain certain principles thereof. In the drawing figures:

FIG. 5 is a detailed view of one face of an alternative embodiment of a keeper for the tandem axle suspension system illustrated in FIGS. 2-4 allowing use with three-inch hangers or five-inch hangers.

Figure 1:
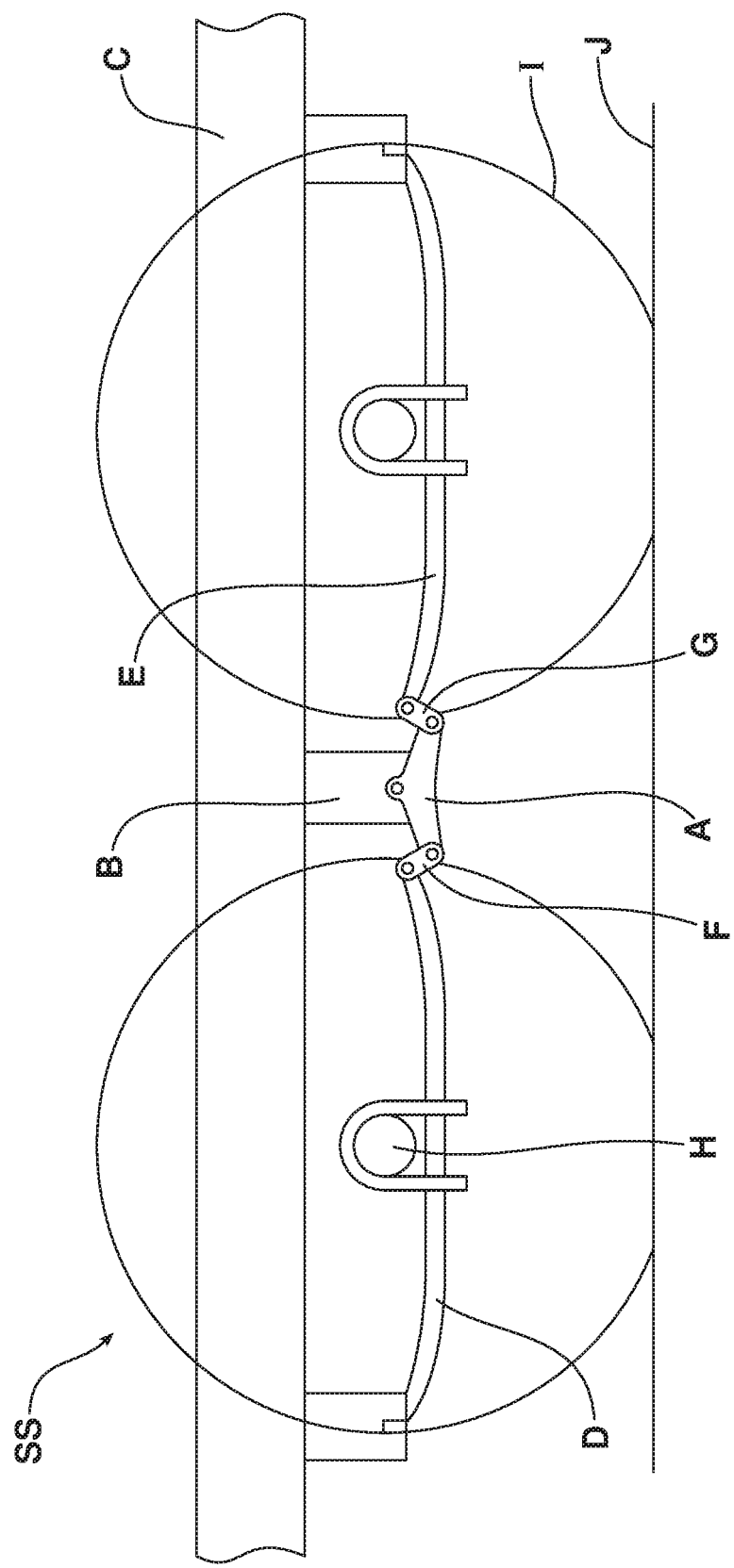
FIG. 1 is a schematic representation of a prior art suspension system incorporating a center equalizer that is connected to the springs by shackles.

Reference will now be made in detail to the present preferred embodiments of the tandem axle suspension system, examples of which are illustrated in the accompanying drawing figures.

DETAILED DESCRIPTION

Reference is now made to FIGS. 2-5 illustrating the new and improved tandem axle suspension system 10. That system 10 includes a first slipper spring 12, a second slipper spring 14 and a keeper 16.

The first slipper spring 12 has a first eye end 18 and a first slipper end 20. The second slipper spring 14 has a second eye end 22 and a second slipper end 24. In operation, the first slipper spring 12 and the second slipper spring 14 are provided in series with the first slipper end 20 and the second slipper end 24 oriented toward each other and held by the keeper 16. Thus, the two slipper springs 12, 14 are oriented so that the longitudinal axis of the first slipper spring 12 is aligned with the longitudinal axis of the second slipper spring 14.

More specifically, the first eye end 18 of the first slipper spring 12 is fixed to the front hanger 26 depending from the trailer frame 28 by means of the mounting bolt 30. A tie plate 32 and U-bolt 34 secure the first slipper spring 12 to the forward rear axle 36.

The second eye end 22 of the second slipper spring 14 is fixed to the rear hanger 38 depending from the trailer frame 28 by means of the mounting bolt 40. A tie plate 42 and U-bolt 44 secure the second slipper spring 14 to the forward rear axle 46.

A mounting bolt 48 secures the keeper 16 to the center hanger 50 which depends from the trailer frame 28. More specifically, the keeper 16 includes a housing that is substantially U-shaped in cross section, including a first end section 52 and a second end section 54 depending from a center section 56. The keeper 16 is open at the bottom and the front and rear ends. A receiver 58 is provided in the center section 56. In the illustrated embodiment, the receiver 58 comprises a slot that receives the center hanger 50. The mounting bolt 48 extends through a first mounting receiver in the first end section 52, a second mounting receiver in the second end section 54 and a third mounting receiver in the center hanger 50.

Here it should be appreciated that the keeper 16 may be secured to the center hanger 50 and/or the trailer frame 28 in another appropriate manner if desired. Thus, for example, the keeper 16 could be secured to the center hanger 50 or trailer frame 28 by welding.

Figure 2:
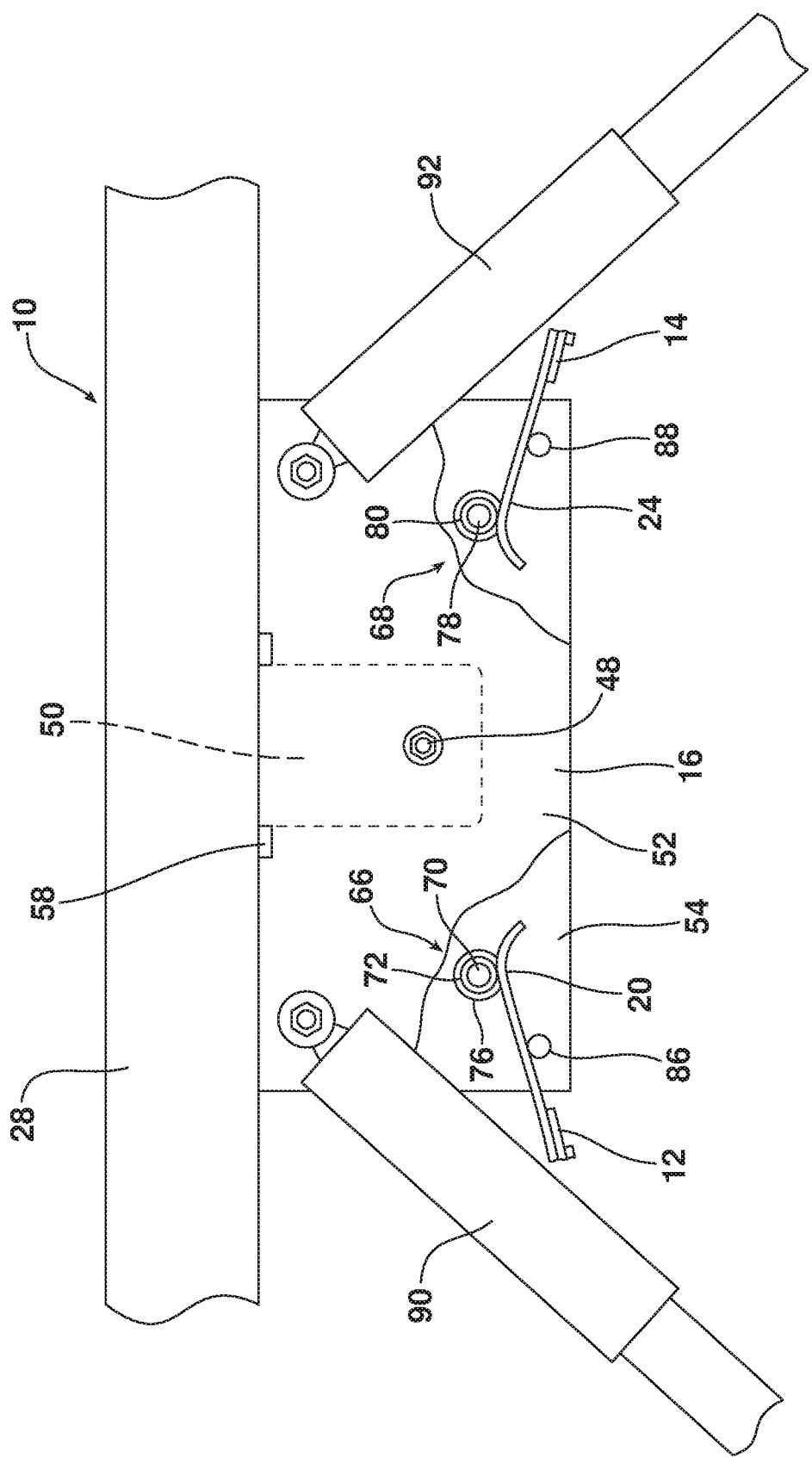
FIG. 2 is a detailed side elevational view of the new and improved tandem axle suspension system including two slipper springs and a center keeper that is fixed in position on the center hanger of the trailer frame. A portion of the keeper has been removed at the lower right and lower left in order to show the slipper ends of the two slipper springs.
Figure 4:
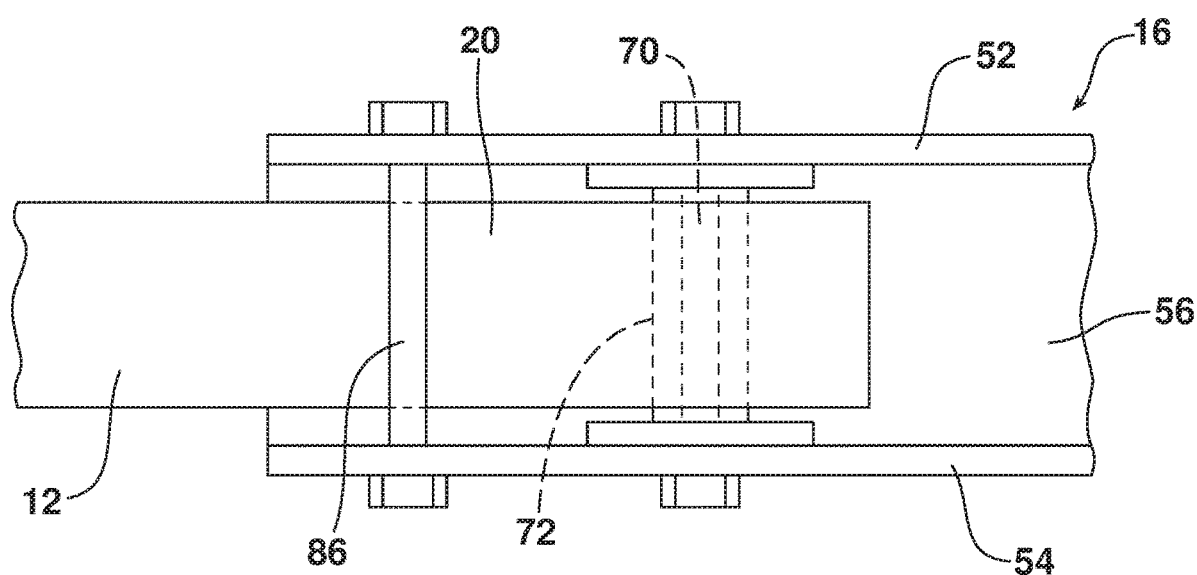
FIG. 4 is a detailed bottom plan view illustrating how the slipper end of a spring is captured between the spring support and the spring retainer bolt of the keeper.

As best illustrated in FIGS. 2 and 4, the keeper 16 includes a first frame support 66 and a second frame support 68. The first frame support 66 includes a first roller bearing bolt 70 and a first roller bearing 72 carried on the first roller bearing bolt. Similarly, the second frame support 68 includes a second roller bearing bolt 78 and a second roller bearing 80 carried on the second roller bearing bolt. Thus, the second frame support 68 mirrors the first frame support 66.

The first frame support 66 is supported by and rides on the first slipper end 20 of the first slipper spring 12 while the second frame support 68 is supported by and rides on the second slipper end 24 of the second slipper spring 14. The high strength precision roller bearings 72, 80 ensure a long and carefree service life.

More specifically, the first slipper end 20 engages the first roller bearing 72. Similarly, the second slipper end 24 engages the second roller bearing 80. This arrangement provides for free sliding engagement of the slipper ends 20, 24 with the respective first and second frame supports 66, 68. Those slipper ends 20, 24 are not linked together. This effectively creates a fully independent tandem axle suspension. As a result, axle roll up is virtually eliminated.

As further illustrated in FIG. 2, the keeper 16 further includes a first spring retainer bolt 86 and a second spring retainer bolt 88. The first slipper end 20 is captured in the keeper 16 between the two end sections 52, 54, the first roller bearing 72 of the first frame support 66 and the first spring retainer bolt 86. That first spring retainer bolt 86 prevents the first slipper end 20 from falling out of the keeper 16 if the trailer is lifted.

Similarly, the second slipper end 24 is captured in the keeper 16 between the two end sections 52, 54, the second roller bearing 80 of the second frame support 68 and the second spring retainer bolt 88. The second spring retainer bolt 88 prevents the second slipper end 24 from falling out of the keeper 16 if the trailer is lifted.

Figure 3:
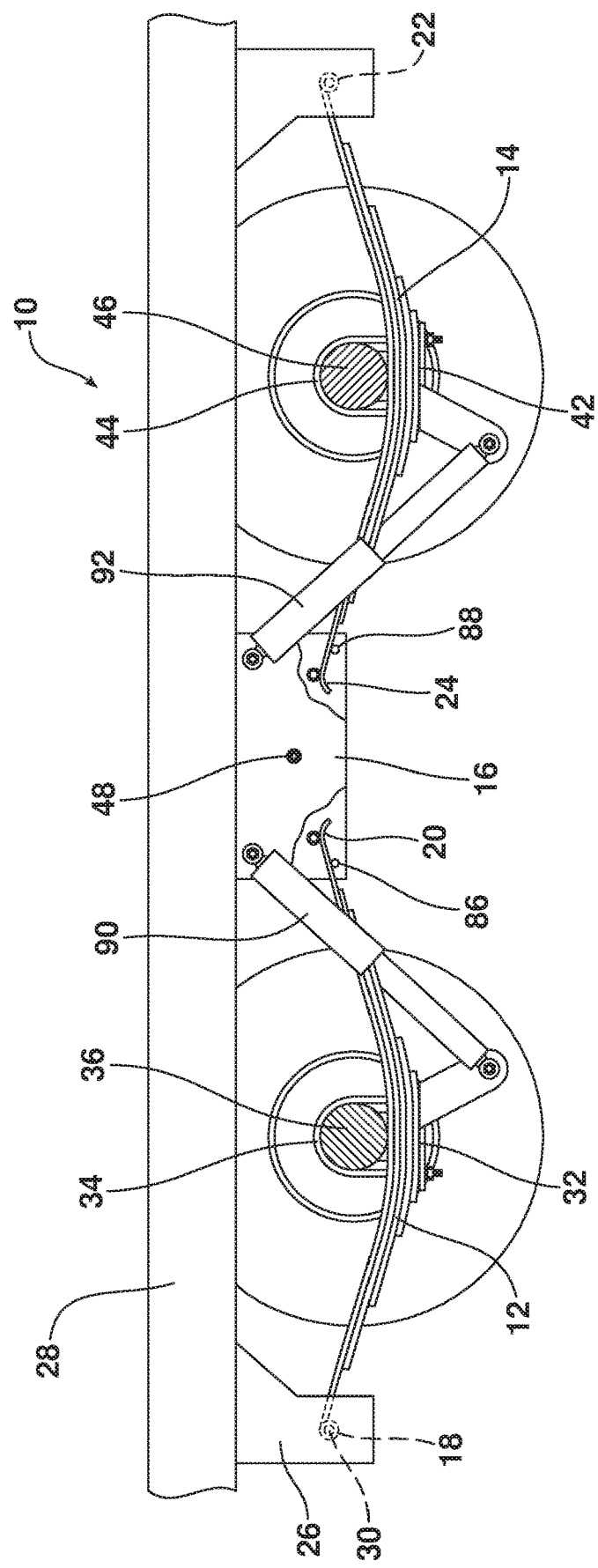
FIG. 3 is a schematic side elevational view of the complete tandem axle suspension system for one side of a tandem axle trailer.

As further illustrated in FIGS. 2 and 3, the keeper 16 may also be connected to two shock absorbers 90, 92 of a shock absorber mounting assembly such as described in, for example, U.S. Pat. No. 9,333,827, the full disclosure of which is incorporated herein by reference. In this way, the tandem axle suspension system 10 may be adapted to also provide suspension alignment capability. The shocks 90, 92 also provide for control of spring rebound and compression energy. The prior art suspension system SS illustrated in FIG. 1 does not address suspension alignment, spring rebound or compression energy.

Reference is now made to FIG. 5 illustrating one possible alternative embodiment of a keeper 100 which may be incorporated into the tandem axle suspension system 10 in place of the keeper 16. The keeper 100 allows for enhanced adjustability and versatility. The keeper 100 may be used with either a three inch center hanger 50 or a five inch center hanger 50 making it compatible with a greater number of OEM trailers.

Similar to the keeper 16, the keeper 100 includes a U-shaped housing with a first end section 102 and a second end section 104 (mostly concealed in FIG. 5 behind the end section 102) depending from a center section 106. In addition, a receiver 108, like the receiver 58 of the keeper 16, is provided in the center section 106 to receive the center hanger 50 of a trailer frame 28.

As further illustrated in FIG. 5, the first and second end sections 102, 104 both include a first set of receivers 110. That first set of receivers 110 includes a first spring retainer receiver 112, a second spring retainer receiver 114, a first roller bearing mounting receiver 116 and a second roller bearing mounting receiver 118.

In addition, the first and second end sections 102, 104 include a second set of receivers 120. That second set of receivers 120 includes a third spring retainer receiver 122, a fourth spring retainer receiver 124, a third roller bearing mounting receiver 126 and a fourth roller bearing mounting receiver 128.

In addition, the first and second end sections 102, 104 include a third set of receivers 130 for mounting the first shock 90. That third set of mounting receivers 130 includes a first shock mounting receiver 132, a second shock mounting receiver 134, a third shock mounting receiver 136 and a fourth shock mounting receiver 138.

Still further, the first and second end sections 102, 104 include a fourth set of receivers 140 for mounting the second shock 92. That fourth set of mounting receivers 140 includes a fifth shock mounting receiver 142, a sixth shock mounting receiver 144, a seventh shock mounting receiver 146 and an eighth shock mounting receiver 148.

In the illustrated embodiment, the first set of receivers 110, the second set of receivers 120, the third set of receivers 130 and the fourth set of receivers 140 all comprise apertures formed in the end sections 102, 104 of the keeper 100.

In the illustrated embodiment of the keeper 100, the first roller bearing mounting receiver 116 is provided between the first shock mounting receiver 132 and the second shock mounting receiver 134. The second roller bearing mounting receiver 118 is provided between the third shock mounting receiver 136 and the fourth shock mounting receiver 138.

The third roller bearing mounting receiver 126 is provided between the fifth shock mounting receiver 142 and the sixth shock mounting receiver 144. The fourth roller bearing mounting receiver 128 is provided between the seventh shock mounting receiver 146 and the eighth shock mounting receiver 148.

For three inch center hangers 50, one uses the first spring retainer receiver 112 to mount the first spring retainer 86 and the first roller bearing mounting receiver 116 to mount the first frame support 66. One uses the third spring retainer receiver 122 to mount the second spring retainer 88 and the third roller bearing mounting receiver 126 to mount the second frame support 68. One would use either of the third or fourth shock mounting receivers 136, 138 to mount the first shock 90 and either of the seventh or eighth shock mounting receivers 146, 148 to mount the second shock 92.

In contrast, for five inch center hangers 50, one uses the second spring retainer receiver 112 to mount the first spring retainer 86 and the second roller bearing mounting receiver 118 to mount the first frame support 66. One uses the fourth spring retainer receiver 124 to mount the second spring retainer 88 and the fourth roller bearing mounting receiver 128 to mount the second frame support 68. One would use either of the first or second shock mounting receivers 132, 134 to mount the first shock 90 and either of the fifth or sixth shock mounting receivers 142, 144 to mount the second shock 92.

The elongated mounting receiver 150 provides some additional adjustability when mounting the keeper 100 to the center hanger 50 by means of the bolt 48.

The foregoing has been presented for purposes of illustration and description. It is not intended to be exhaustive or to limit the embodiments to the precise form disclosed. Obvious modifications and variations are possible in light of the above teachings. For example, this technology may be readily adapted to triple axle trailers. All such modifications and variations are within the scope of the appended claims when interpreted in accordance with the breadth to which they are fairly, legally and equitably entitled.

What is claimed:

1. A tandem axle suspension assembly, comprising:
   a first slipper spring having a first eye end and a first slipper end;
   a second slipper spring having a second eye end and a second slipper end wherein said first slipper spring and said second slipper spring are provided in series with said first slipper end and said second slipper end oriented toward each other; and
   a keeper receiving said first slipper end and said second slipper end wherein said keeper includes a first frame support that rides on said first slipper end and a second frame support that rides on said second slipper end and wherein said first frame support includes a first roller hearing.

2. The tandem axle suspension assembly of claim 1, wherein said first frame support includes a first roller bearing bolt and said first roller bearing is received around said first roller bearing bolt.

3. The tandem axle suspension assembly of claim 2, wherein said second frame support includes a second roller bearing.

4. The tandem axle suspension assembly of claim 3, wherein said second frame support includes a second roller bearing bolt and said second roller bearing is received around said second roller bearing bolt.

5. The tandem axle suspension assembly of claim 1 wherein said keeper includes a housing.

6. The tandem axle suspension assembly of claim 5, wherein said housing has a u-shaped cross-section.

7. The tandem axle suspension assembly of claim 6, wherein said housing includes a receiver that receives a center hanger on a frame of a trailer.

8. The tandem axle suspension assembly of claim 7, wherein housing includes a center section, a first end section depending from said center section and a second end section depending from said center section.

9. The tandem axle suspension assembly of claim 8, Wherein said receiver is provided in said center section between said first end section and said second end section.

10. The tandem axle suspension assembly of claim 9, further including a mounting bolt extending through a first mounting receiver in said first end section, a second mounting receiver in said second end section and a third mounting receiver in said center hanger.

11. The tandem axle suspension assembly of claim 10, wherein said keeper further includes a first spring retainer bolt and said first slipper end is captured between said first spring retainer bolt and said first roller bearing.

12. The tandem axle suspension assembly of claim 11, wherein said keeper further includes a second spring retainer bolt and said second slipper end is captured between said second spring retainer bolt and said second roller bearing.

13. A keeper for a tandem axle suspension assembly, comprising: a housing including (a) a first set of receivers including a first spring retainer receiver, a second spring retainer receiver, a first roller bearing mounting receiver and a second roller bearing mounting receiver and (b) a second set of receivers including a third spring retainer receiver, a fourth spring retainer receiver, a third roller bearing mounting receiver and a fourth roller bearing mounting receiver.

14. The keeper of claim 13, further including a third set of receivers for mounting a first shock, said third set of receivers including a first shock mounting receiver, a second shock mounting receiver, a third shock mounting receiver and a fourth shock mounting receiver.

15. The keeper of claim 14, further including a fourth set of receivers for mounting a second shock, said fourth set of mounting receivers including fifth shock mounting receiver, a sixth shock mounting receiver, a seventh shock mounting receiver and an eighth shock mounting receiver.

16. The keeper of claim 15, wherein (a) said first roller bearing mounting receiver is provided between said first shock mounting receiver and said second shock mounting receiver, (h) said second roller bearing mounting receiver is provided between said third shock mounting receiver and said fourth shock mounting receiver, (c) said third roller bearing receiver is provided between said fifth shock mounting receiver and said sixth shock mounting receiver, and (d) said fourth roller bearing mounting receiver is provided between said seventh shock mounting receiver and said eighth shock mounting receiver.

* * * * *